2,944,888

MANUFACTURE OF TITANIUM

James Paterson Quin, Widnes, England, assignor to Imperial Chemical Industries Limited, London, England, a corporation of Great Britain No Drawing. Filed Dec. 26, 1956, Ser. No. 630,466

Claims priority, application Great Britain Jan. 17, 1956

8 Claims. (Cl. 75—84.5)

This invention relates to the extraction of metals and more particularly to improvements in or relating to the extraction of titanium from its halides.

In British patent specification No. 717,930 (copending U.S. application, Serial No. 317,855, filed October 31, 1952, and now U.S. Patents No. 2,827,371) there is described and claimed a process for the manufacture of metallic titanium which comprises reacting titanium tetrachloride with sodium in an inert atmosphere at a temperature between 200° C. and the melting point of sodium chloride while maintaining in the reactor an agitated non-adherent particulate bed of reaction products and thereafter recovering titanium metal from the said products. In a preferred form of the invention the reaction is carried out between a temperature of 480° and 620° C. and the process may be carried out in a continuous manner.

In a further preferred form of the invention the titanium product is heated at a temperature in excess of 800° C. in the presence of the other product of reaction, sodium chloride, after the mixture has been removed from the reaction vessel.

I have now found that there is a considerable advantage in carrying out the above reaction in two stages in the first of which the titanium is prepared by heating the reactants at a temperature between 200° and the melting point of sodium chloride while maintaining in the reactor an agitated non-adherent particulate bed of reaction products. In the second stage however, a post reaction heat treatment of the titanium product is carried out by heating the titanium and sodium chloride mixture at a temperature between 600° C. and 780° C.

According to the present invention a process for the manufacture of metallic titanium comprises reacting titanium tetrachloride with sodium in an inert atmosphere at a temperature between 200° C. and the melting point of sodium chloride while maintaining in the reactor an agitated non-adherent particulate bed of reaction products and thereafter heating the product mixture at a temperature between 600° C. and 780° C. in a separate vessel and recovering titanium therefrom.

Preferably the second stage in the process is carried out at a temperature of between 700° C. and 750° C. and this we have found has the effect of rendering the titanium powder much less reactive and more amenable to the subsequent leaching in preparation for a titanium of good quality.

As mentioned in British patent specification 717,930 advantageously the initial reaction in which metallic titanium is prepared is carried out in a fluidised bed, fluidised suitably by means of circulating argon. We have now found that the second stage of our process may be carried out satisfactorily if the reaction products from the first stage are continuously withdrawn into an electrically heated mild steel vessel, provided with a stirrer. Suitably the heating in this vessel is carried out for a period of 5 to 7 hours in an atmosphere of argon to avoid the deleterious effects which occur if oxygen or nitrogen is present. At the end of the heat treatment the mixture, still in the form of discrete particles, is withdrawn from the vessel and allowed to cool in an inert atmosphere. The titanium is recovered by leaching the mixture with water and is then arc melted to yield massive titanium product. Alternatively, the titanium-salt mixture may be arc melted directly to give massive titanium.

My copending application Serial No. 371,726, filed July 31, 1953, describes a process for making titanium by reducing titanium tetrachloride with metallic sodium and maintaining the titanium product at a temperature above 800° C., for a period of at least 15 minutes, the entire process being effected in an atmosphere inert to the titanium.

The following example illustrates but does not limit our invention.

Example

Titanium tetrachloride and sodium were added to a fluidised bed reactor, as described in British patent specification 717,950, in such proportions that the non-adherent particulate titanium-salt mixture so produced contained 0.3% excess titanium tetrachloride in the form of titanium subhalides. As the addition of the reactants proceeded, the volume of the reactor bed was maintained approximately constant by continuously withdrawing the reaction product into an electrically heated mild steel vessel, capable of holding approximately 1 ton of product, and provided with a stirrer. When the vessel was charged, the contents, which left the fluidised bed at approximately 600° C. were heated to 750° and stirred at this temperature for 6 hours. The entire operation was carried out under an atmosphere of argon. It was found that the titanium in the powder had been de-activated by this treatment and could be recovered by aqueous leaching in accordance with the procedure described in copending U.S. application Serial No. 461,688, filed October 11, 1954, to give a metallic titanium powder which on melting yielded a massive titanium with a hardness of 140 DPN.

What I claim is:

1. A process for the manufacture of metallic titanium which comprises reacting excess titanium tetrachloride with sodium in an inert atmosphere at a temperature between 200° C. and the melting point of sodium chloride to obtain a reaction product comprising titanium, sodium chloride and excess tetrachloride in the form of titanium sub-halides, while maintaining in the reactor an agitated non-adherent particulate bed of reaction products and thereafter heating the product mixture, before any leaching operation thereon, for approximately five to seven hours in an inert atmosphere at a temperature between 600° C. and 780° C. in a separate vessel while maintaining said product mixture in the form of an agitated, substantially non-adherent particulate bed of discrete particles and recovering titanium therefrom.

2. A process according to claim 1 in which the reaction between titanium tetrachloride and sodium is carried out at a temperature between 480° C. and 620° C.

3. A process according to claim 1 in which the reaction between titanium tetrachloride and sodium is carried out in a fluidised bed.

4. A process according to claim 1 in which the reactants are fed directly into an enclosed vessel provided with mixing and conveying means in which the reaction takes place and from which the products may be discharged into a separate vessel and titanium recovered therefrom.

5. A continuous process according to claim 1 in which the products of reaction are withdrawn continuously from the reaction vessel and fed continuously to the aforesaid separate vessel where the products are heated at a temperature between 600° C. and 780° C.

6. A process according to claim 1 in which the products are heated to a temperature of between 700° C. and 750° C. in a separate vessel.

7. A process according to claim 1 in which the products are heated to a temperature of between 700° C. and 750° C. in a separate vessel for a period of between 5 and 7 hours.

8. A process according to claim 1 in which the products after being heated in the separate vessel are finally heated in an arc furnace at a temperature above the melting point of titanium metal.

References Cited in the file of this patent

UNITED STATES PATENTS

| | | |
|---|---|---|
| 2,205,854 | Kroll | June 25, 1940 |
| 2,618,550 | Hampel et al. | Nov. 18, 1952 |
| 2,703,752 | Glasser et al. | Mar. 8, 1955 |
| 2,758,921 | Schmidt | Aug. 14, 1956 |
| 2,813,787 | Schmidt | Nov. 19, 1957 |
| 2,824,799 | Hansley | Feb. 25, 1958 |

FOREIGN PATENTS

| | | |
|---|---|---|
| 717,930 | Great Britain | Nov. 3, 1954 |
| 720,517 | Great Britain | Dec. 22, 1954 |
| 632,564 | Great Britain | Nov. 28, 1949 |